No. 767,058. PATENTED AUG. 9, 1904.
C. R. HARVIN.
COTTON PICKER.
APPLICATION FILED JUNE 20, 1903.
NO MODEL. 2 SHEETS—SHEET 2.
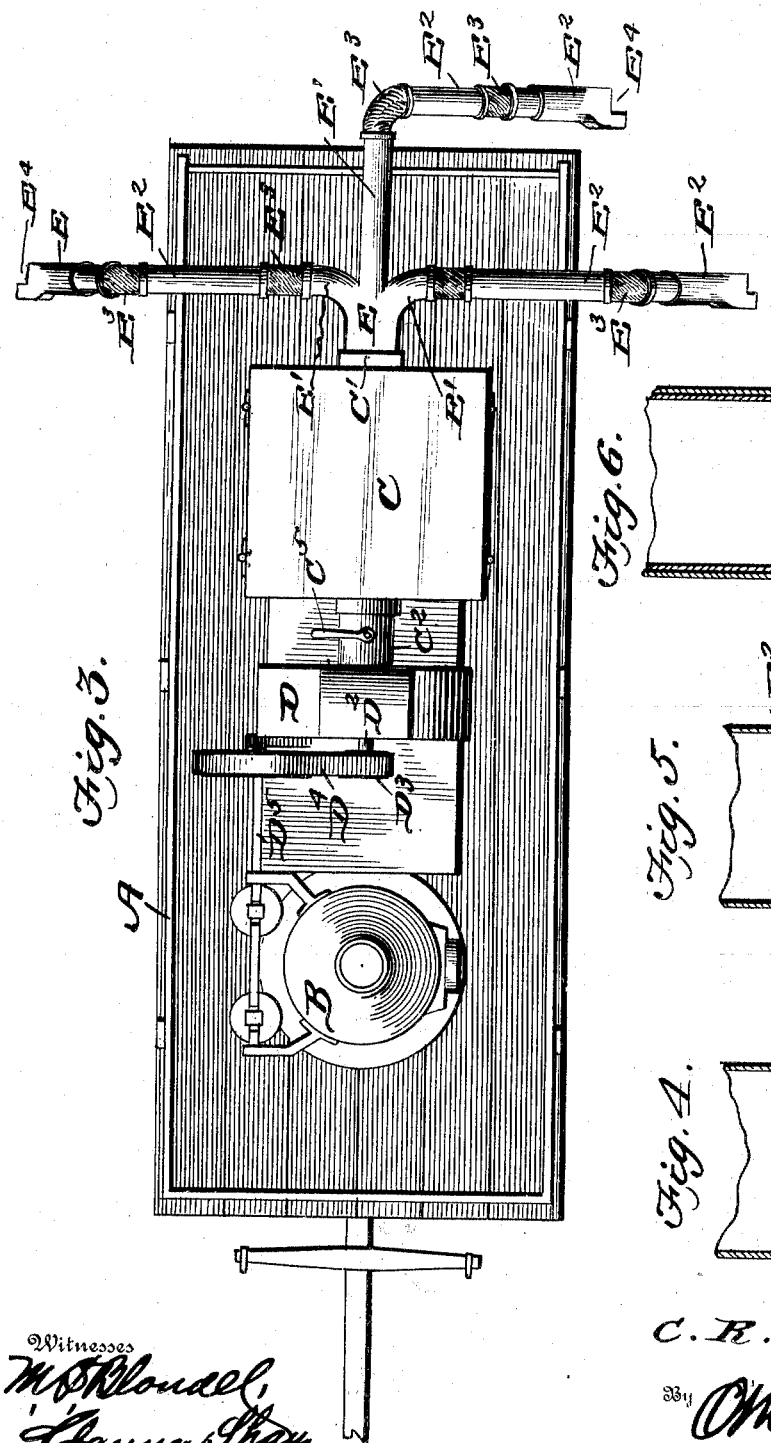
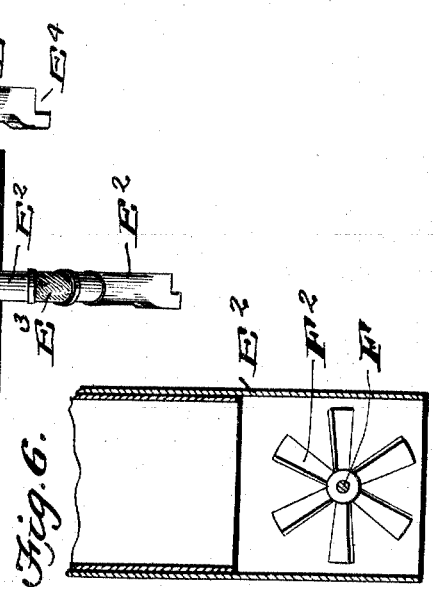
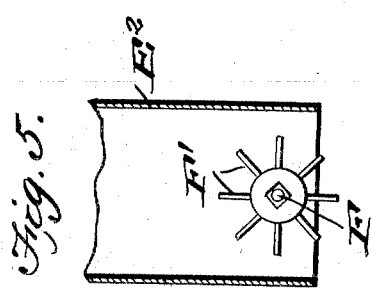
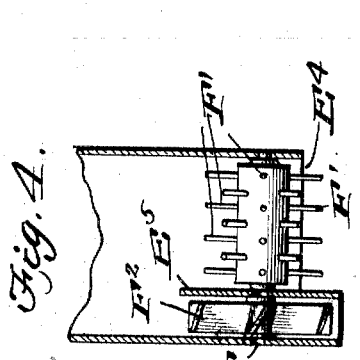

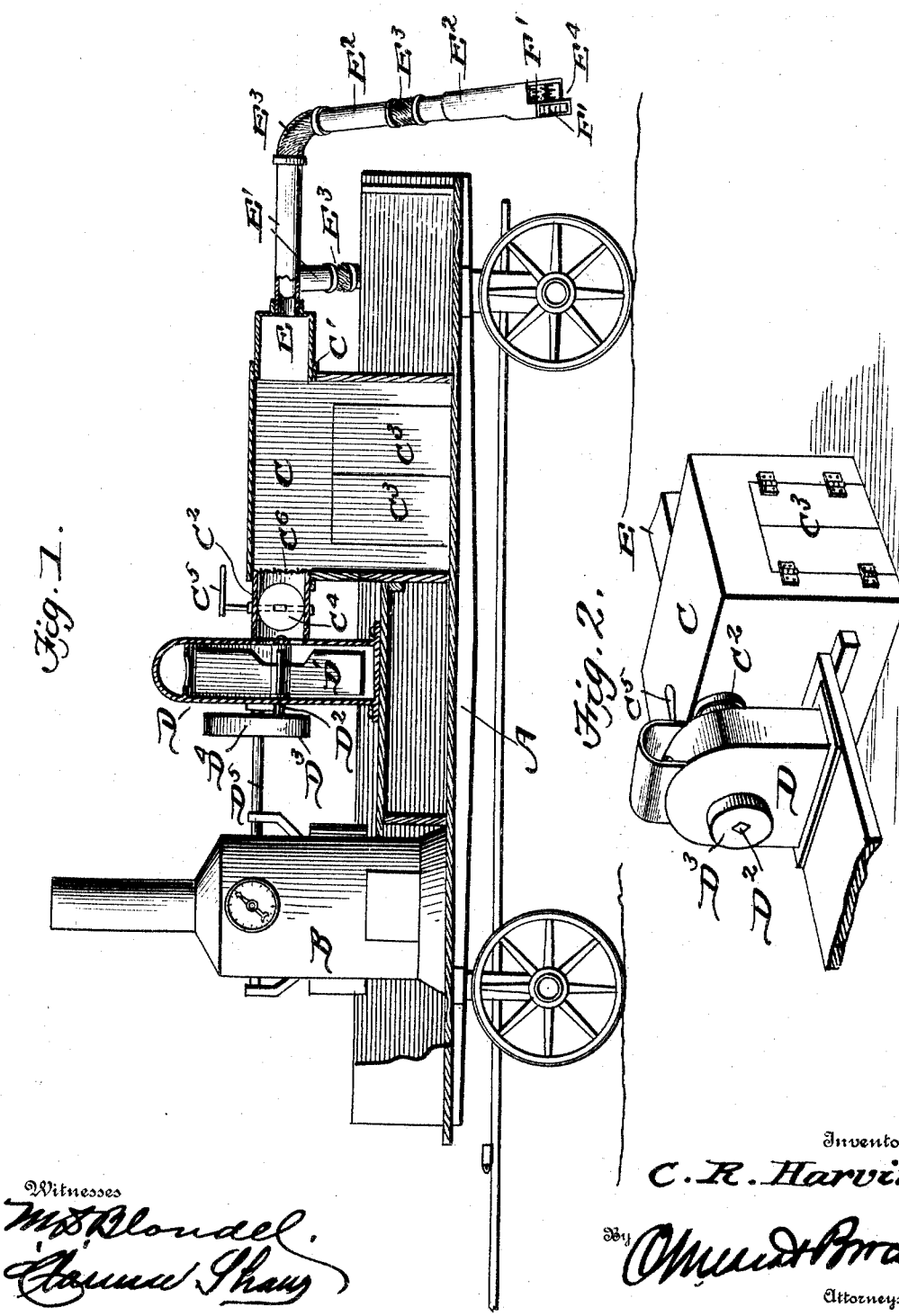

No. 767,058. Patented August 9, 1904.

UNITED STATES PATENT OFFICE.

CHARLES R. HARVIN, OF MANNING, SOUTH CAROLINA.

COTTON-PICKER.

SPECIFICATION forming part of Letters Patent No. 767,058, dated August 9, 1904.

Application filed June 20, 1903. Serial No. 162,390. (No model.)

*To all whom it may concern:*

Be it known that I, CHARLES R. HARVIN, a citizen of the United States, residing at Manning, in the county of Clarendon and State of South Carolina, have invented a new and useful Cotton-Picker, of which the following is a specification.

My invention relates to that class of harvesters known at "cotton-pickers," and has for its object the automatic picking of the cotton fiber from the boll and the conveyance of same to a suitable wheeled receptacle.

I am aware of the fact that pickers have been designed and patented in which tubes were used and an air-blast produced in said tubes, the theory being that the cotton would be drawn from the boll by suction and carried into the tubes in a manner similar to that in which it is unloaded from wagons at a gin. Experiment, however, has shown that an air-current powerful enough to rapidly draw loose cotton into a gin will not separate the cotton cleanly from a boll. There would be, of course, much fairly loose cotton which could be picked in this manner; but some cotton would remain in almost all the bolls and in many practically all of the cotton would be left. The main object of my device, therefore, is to overcome this objection to pneumatic pickers by supplying means for loosening the cotton in the bolls.

In the accompanying drawings, Figure 1 is a perspective view of my improved picker. Fig. 2 is a perspective view of the receptacle and fan-casing. Fig. 3 is a plan view. Figs. 4, 5, and 6 are detail views, partly in section, of the picking device.

In carrying out my invention I employ a wagon A, which if the cotton is not too high may be an ordinary farm-wagon, and on the bed of the wagon I mount an engine B, which may be an oil, gas, or steam engine, as may be most convenient. On the wagon is mounted a storage-receptacle C, having a rearwardly-extending pipe-section $C'$ and a forwardly-extending section $C^2$, opening directly opposite the section $C'$ and leading and opening into a fan-chamber D, containing a fan $D'$, carried by a shaft $D^2$, which without the casing carries a pulley $D^3$, driven by a belt $D^4$ from a pulley mounted on a shaft $D^5$. Doors $C^3$ are provided in one side of the receptacle, while a valve $C^4$ is located in the pipe $C^2$, the valve being operable by a handle $C^5$ on the upper side of the pipe-section. A wire screen $C^6$ is positioned within the receptacle and over the entrance to the pipe $C^2$. A short pipe-section E is secured to the outer end of the section $C'$ and divides into a plurality of branches $E'$. To the sections $E'$ are connected pipes, each comprising straight short rigid sections $E^2$, connected by flexible joints $E^3$. As many of these sections and joints may be used as desired, and the last and end section is cut away on one side, as shown at $E^4$, and the cut-out and non-cut-out portions are divided by a longitudinal partition $E^5$, thereby forming at the end of each branch two parallel passage-ways, the smaller one extending and opening in advance of the larger. Journaled in the sides of each end section and passing through the partition-wall $E^5$ is a revoluble shaft F, enlarged in the larger passage-way. This enlarged portion carries a plurality of pins $F'$, which project without the passage-way. In the smaller passage-way the non-reduced portion carries a fan $F^2$, rigidly secured to the shaft.

In operation the wagon is driven through the field of cotton, the end sections $E^2$ being in the hands of the assistants, and the engine B started, the valve $C^4$ opened and the end sections $E^2$ held to the bolls of cotton. As soon as the engine is started the fan $D'$ is revolved, drawing air through the flexible pipe-sections, through the storage-receptacle, and into the fan-casing, the air escaping through an opening in the top of the latter. The current of air passing into the end sections $E^2$ will revolve the fan $F^2$, which will revolve the bur $F'$, and this projecting from the pipe end will loosen the cotton in the boll and the current of air will draw it into the receptacle. The screen $C^6$ will prevent the cotton from passing into the fan-chamber, and by occasionally turning the valve $C^4$ and cutting off the draft for a moment any cotton that has been carried to the screen and held there by the current of air will fall into the lower part of the receptacle. The doors $C^3$ permit the accumulated cotton to be removed from the receptacle as often as required to keep a passage clear for the air-current.

The last section of each branch is in two parts, the end piece telescoping on the inner part, thus enabling the operator to bring the bur nearer the boll without having to move the entire branch pipe.

Having thus fully described my invention, what I claim as new, and desire to secure by Letters Patent, is—

The combination with a cotton-picking machine having a pipe attached thereto, of a rigid end section carried by said pipe, said section being cut away on one side, a longitudinal partition arranged on the line of the cut, a shaft arranged transversely in said section, and passing through the partition, a bur carried by the shaft, a fan carried by the shaft on the opposite side of the partition, the blades of said fan being adapted to project to one side and in advance of the bur, and means for creating a current of air through said pipe-section.

CHARLES R. HARVIN.

Witnesses:
JOSEPH SPIOTT,
F. I. RICHARDSON.